(12) United States Patent
Shah et al.

(10) Patent No.: US 8,498,841 B2
(45) Date of Patent: Jul. 30, 2013

(54) MAPPED THERMAL ELECTRIC COOLING

(75) Inventors: Amip Shah, Santa Clara, CA (US);
Chandrakant Patel, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 634 days.

(21) Appl. No.: 12/764,286

(22) Filed: Apr. 21, 2010

(65) Prior Publication Data

US 2011/0264433 A1  Oct. 27, 2011

(51) Int. Cl.
*G06F 17/50* (2006.01)

(52) U.S. Cl.
USPC ........ 703/2; 703/17; 706/14; 706/15; 706/23; 706/45; 257/712; 257/714; 257/715; 716/104; 716/105

(58) Field of Classification Search
USPC ... 703/2, 17; 257/712, 714, 715, 717; 706/14, 706/15, 23, 45; 716/104, 105
See application file for complete search history.

(56) References Cited

U.S. PATENT DOCUMENTS

| | | | |
|---|---|---|---|
| 5,764,518 A * | 6/1998 | Collins | 700/95 |
| 6,981,380 B2 | 1/2006 | Chrysler et al. | |
| 7,430,870 B2 | 10/2008 | Chou et al. | |
| 7,436,059 B1 | 10/2008 | Ouyang | |
| 7,620,613 B1 * | 11/2009 | Moore et al. | 706/62 |
| 2006/0113661 A1 * | 6/2006 | Yamabuchi et al. | 257/706 |
| 2008/0236175 A1 | 10/2008 | Monferrer et al. | |

* cited by examiner

*Primary Examiner* — Thai Phan

(57) ABSTRACT

Methods and apparatus are provided for use with thermal electric cooling devices (TECDs). An apparatus is mapped so as to identify the heat dissipating entities and zones thereof. A first cooling plan is devised in accordance with the mapping, the cooling plan being dependant upon TECDs. At least one other cooling plan is devised that is distinct from the first cooling plan. The coefficient of performance (COP) for each of the cooling plans is calculated. One of the cooling plans is selected and implemented in accordance with a comparison of the COPs. Precision, zone-oriented cooling is provided, avoiding excessive material scale and wasted energy.

15 Claims, 4 Drawing Sheets

MAPPED THERMAL ELECTRIC COOLING

BACKGROUND

Computer servers, laptop computers and other electronic apparatus use numerous types of electronic devices and components. Many of these devices dissipate respective amounts of heat during normal operation. Additionally, some electronic devices are characterized by one or more heat dissipating zones. Rejection of this heat away from the electronic components and, ultimately, the apparatus in which they operate, is imperative to device longevity and proper function.

Various methods of heat rejection have been devised and used. However, known cooling solutions are often of excessive scope, resulting in undesirable implementation costs or energy consumption. The present teachings address the foregoing and other concerns.

BRIEF DESCRIPTION OF THE DRAWINGS

The present embodiments will now be described, by way of example, with reference to the accompanying drawings, in which.

DETAILED DESCRIPTION

Introduction

Methods and apparatus are provided for use with thermal electric cooling devices (TECDs). An apparatus is mapped so as to identify the heat dissipating entities and zones thereof. The operating sequence of those zones can also be considered during the mapping. A first cooling plan is devised in accordance with the mapping, the first cooling plan being dependant upon one or more TECDs. At least one other cooling plan is devised that is different than the first cooling plan. The coefficient of performance (COP) for each of the cooling plans is calculated. One of the cooling plans is selected and implemented in accordance with a comparison of the COPs. Precision, zone-oriented cooling is provided, avoiding excessive material scale and wasted energy.

In one embodiment, a method is performed, at least in part, using a computer. The method includes mapping one or more heat dissipating entities of an apparatus. The method also includes determining a first cooling plan in accordance with the mapping. The first cooling plan is dependant upon one or more thermal electric cooling devices. The method also includes determining a second cooling plan different than the first cooling plan. The method additionally includes calculating a first coefficient-of-performance (COP) for the first cooling plan and a second COP for the second cooling plan. The method further includes implementing either the first cooling plan or the second cooling plan in accordance with a comparison of the first COP with the second COP.

In another embodiment, an apparatus includes a plurality of heat dissipating entities. Each of the heat dissipating entities is respectively defined by one or more heat dissipating zones. The apparatus also includes a plurality of thermal electric cooling devices that are disposed in heat transfer relationship with respective ones of the heat dissipating entities. Each of the thermal electric cooling devices corresponds to one or more of the heat dissipating zones. At least one of the heat dissipating entities of the apparatus is not related to or cooperative with any of the thermal electric cooling devices.

First Illustrative Apparatus

Figure 1:
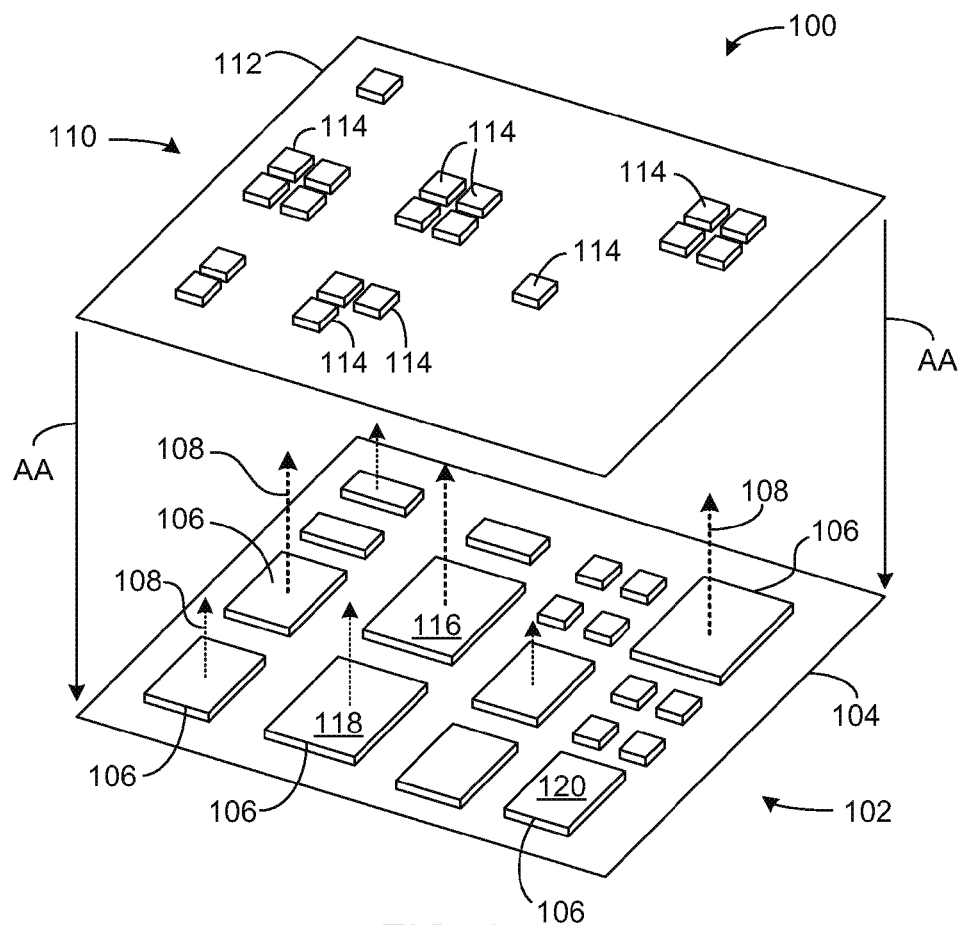
FIG. 1 is an isometric block diagram of an apparatus according to one embodiment.

Reference is now directed to FIG. 1 which depicts an isometric block diagram of an apparatus 100. The apparatus 100 is illustrative and non-limiting with respect to the present teachings. Thus, other apparatuses, devices or systems can be configured and/or operated in accordance with the present teachings. The apparatus 100 is depicted in a layer-wise disassembled state in the interest of clarity.

The apparatus 100 includes an active device layer 102. The active device layer 102 includes a circuit board 104. The circuit board 104 can be defined by any suitable circuit board bearing electrical traces and interconnections (not shown) between electrical or electronic components.

The active device layer 102 also includes a plurality of electronic devices 106. The electronic devices 106 can be respectively defined by various components such as, for non-limiting example, memory devices, microprocessors, microcontrollers, field-programmable gate arrays (FPGA), analog or digital or hybrid integrated circuits, power transistors, relays, etc. Other types of electronic or electrical devices 106 can also be used. Some or all of the electronic devices 106 dissipate respective amounts (rates) of heat 108 during normal operation. Such electronic devices 106 are also referred to as heat dissipating entities (or devices) for purposes herein. The active device layer 102 and the electronic devices 106 thereon can define, at least in part, a computer, a control system, a data storage device, measuring instrumentation, etc.

The apparatus 100 also includes a thermal electric layer 110. The thermal electric layer 110 includes a supportive card (or substrate) 112. The substrate 112 supports a number of thermal electric cooling devices (TECD) 114. Each TECD 114 is a solid-state device configured to transfer heat away from at least a portion of a corresponding electronic device 106. In one embodiment, each TECD 114 is defined by a Peltier cooling element or module. Other thermal electric cooling devices 114 can also be used.

The apparatus 100 is depicted in a layer-wise disassembled state as noted above. During complete assembly, the supportive card 112 and the TECDs 114 thereon are in contact with electronic devices 106. That is, the thermal electric layer 110 is in overlying contact with the active device layer 102, as indicated by the assembly arrows "AA". The TECDs 114 are thus supported in heat transfer relationship with respective heat dissipating entities 106. Suitable mounting or bonding mechanisms, heat transfer materials or other means can be used to establish the heat transfer relationship between the TECDs 114 and corresponding electronic devices 106.

It is noted that respective electronic devices 106 are associated with varying numbers of the TECDs 114. For example, an electronic device 116 is operated in heat transfer relationship with four respective TECDs 114. In turn, an electronic device 118 is operated in heat transfer relationship with three respective TECDs 114. There is a general correspondence between the number of thermal electric cooling devices 114 associated with a particular electronic device 106 and the aggregate heat dissipation rate thereof.

It is to be assumed that the TECDs 114 are characterized by a common (same) heat transfer capacity. It is further noted that some of the electronic devices 106 (e.g., device 120, etc.) are not associated with any of the thermal electric cooling devices 114. This is based on a prior determination or "mapping" of the heat dissipating entities 106 and their respective heat dissipation rates (i.e., watts).

The present teachings therefore contemplate various apparatus and systems wherein thermal electric cooling devices are selectively distributed and operated in accordance with the heat rejecting needs of the electronic devices (or other heat dissipating entities) thereof. Energy efficiency and reduced cost of cooling scheme implementation are thus realized by way of the present teachings.

The terms "zone" and "heat dissipating zone" are interchangeably used herein to refer to a portion of a heat dissipating device (e.g., 106). Any particular electronic device or other heat dissipating entity can be defined by one or more zones. Thermal electric cooling devices (e.g., 114) are used to reject heat from these zones. Any particular TECD can be used to reject heat from one or more zones depending upon operating capacity, form-factor or other characteristics of the TECD. Other embodiments according to the present teachings are presented and discussed below in order to illustrate the immediately foregoing principles.

It is further noted that the thermal electric layer 110 does not include a filled pattern (like a checkerboard) of TECDs 114, but rather includes TECDs 114 that are selectively and purposefully placed in accordance with a zone mapping. This is done in the interest of material and energy conservation, which are principle goals of the present teachings.

Second Illustrative Apparatus

Figure 2:
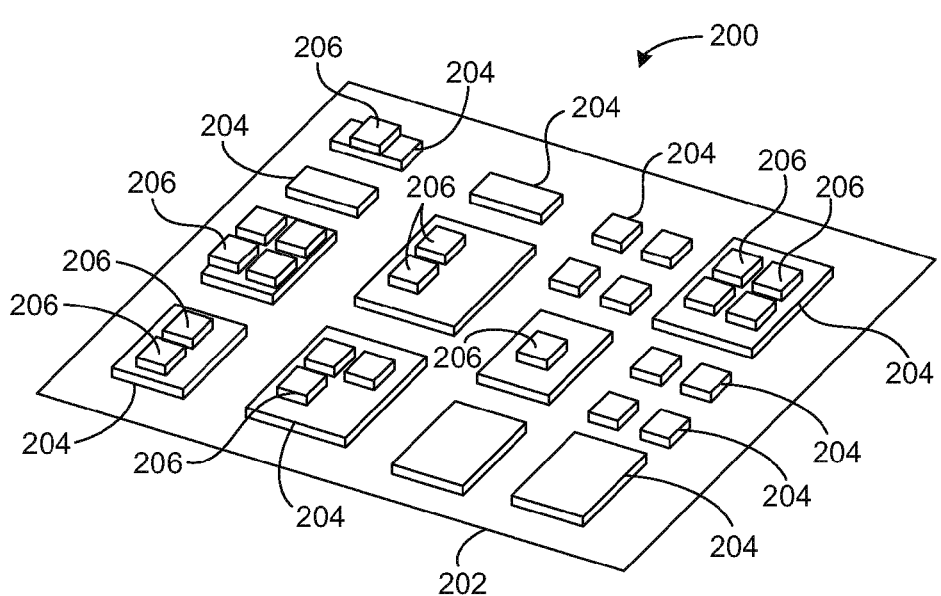
FIG. 2 is an isometric block diagram of an apparatus according to another embodiment.

Attention is now directed to FIG. 2, which depicts an isometric block diagram of an apparatus 200. The apparatus 200 is illustrative and non-limiting with respect to the present teachings. Thus, other apparatuses, devices or systems can be configured and/or operated in accordance with the present teachings.

The apparatus 200 includes a supporting circuit card (or board) 202. The circuit card 202 includes a plurality of electronic devices 204. At least some of the electronic devices 204 are also referred to as heat dissipating entities for purposes herein. The apparatus 200 further includes a number of thermal electric cooling devices (TECD) 206. Each TECD 206 is defined by a solid-state cooling device configured to reject heat from a zone of a heat dissipating entity 204. As such, each TECD 206 is in contacting heat transfer-relationship with a heat dissipating entity 204 of the apparatus 200.

It is noted that the TECDs 206 are characterized by a common form-factor and operating (heat rejecting) capacity. The electronic devices 204 are associated with respectively varying numbers of TECDs 206 in accordance with the heat rejecting needs thereof. Some of the electronic devices 204 have no TECD 206 associated therewith. Other electronic devices 204 have one, two, three or more TECDs 206, respectively, in thermal relationship therewith. The TECDs 206 are disposed in accordance with the previously mapped heat dissipating zones of the electronic devices 204.

Third Illustrative Apparatus

Figure 3:
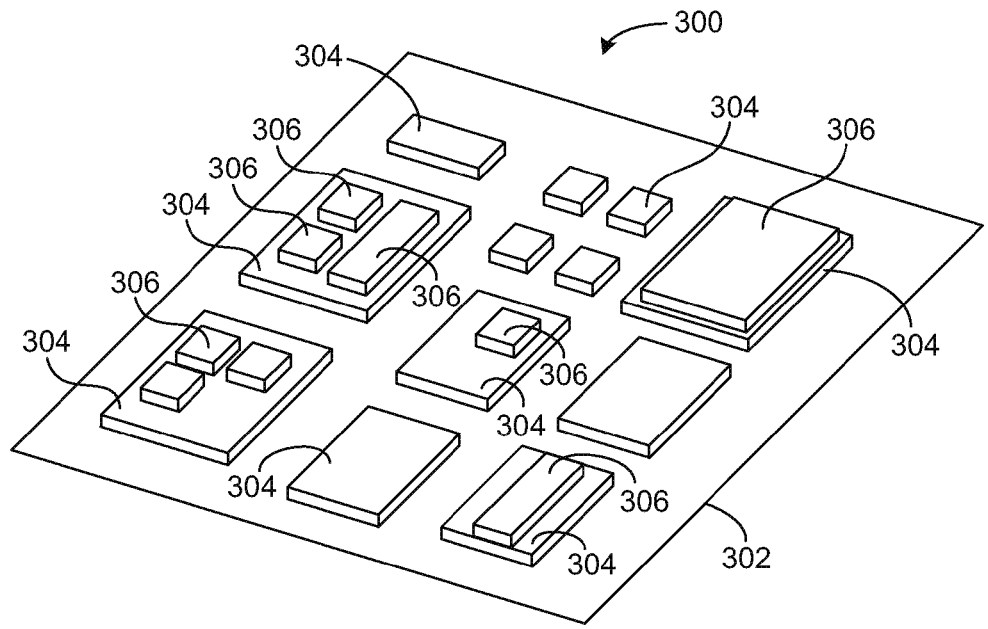
FIG. 3 is an isometric block diagram of an apparatus according to yet another embodiment.

Attention is now directed to FIG. 3, which depicts an isometric block diagram of an apparatus 300. The apparatus 300 is illustrative and non-limiting with respect to the present teachings. Thus, other apparatuses, devices or systems can be configured and/or operated in accordance with the present teachings.

The apparatus 300 includes a supporting circuit card (or board) 302. The circuit card 302 includes a plurality of electronic devices 304. At least some of the electronic devices 304 are also referred to as heat dissipating entities for purposes herein. The apparatus 300 further includes a number of thermal electric cooling devices (TECD) 306. Each TECD 306 is defined by a solid-state cooling device configured to reject heat from one or more zones of a heat dissipating entity 304. As such, each TECD 306 is in contacting heat transfer-relationship with a heat dissipating entity 304 of the apparatus 300.

It is noted that the TECDs 306 are characterized by respectively varying form-factors and heat-rejecting capacities. In turn, electronic devices 304 are associated with respective numbers of TECDs 306. Some of the electronic devices 304 have no TECD 306 associated therewith. The TECDs 306 are disposed in accordance with a previous mapping of the heat dissipating zones of the electronic devices 304.

Fourth Illustrative Apparatus

Figure 4:
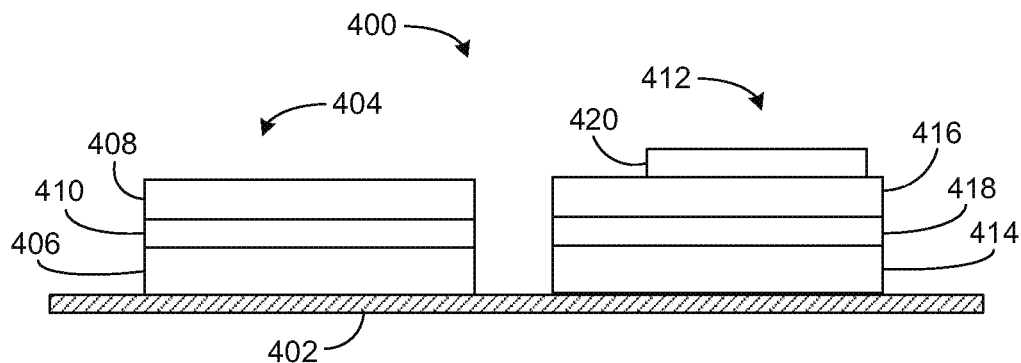
FIG. 4 is an elevation block diagram depicting an apparatus according to one embodiment.

Reference is now made to FIG. 4, which depicts an elevation view of an apparatus 400. The apparatus 400 is illustrative and non-limiting with respect to the present teachings. Other apparatuses, devices or systems can be configured and/ or operated in accordance with the present teachings.

The apparatus 400 includes a circuit board (or substrate) 402. The Circuit board 402 bears an integrated device 404. The integrated device 404 is defined by a first active layer 406. The first active layer 406 is configured to define one or more electronic devices or circuit elements such as, for non-limiting example, diodes, transistors, resistors, capacitors, inductors, etc. As such, the first active layer 406 defines, at least in part, a semi-conductor device or electronic circuit. The first active layer 406 includes one or more aspects that dissipate heat during normal operation, thus defining one or more heat dissipating zones.

The integrated device 404 further includes a second active layer 408. The second active layer 408 is configured to define one or more electronic devices or circuit elements such as, for non-limiting example, diodes, transistors, resistors, etc. The second active layer 408 thus defines, at least in part, a semi-conductor device or electronic circuit. The second active layer 408 includes one or more aspects that dissipate heat during normal operation, thus defining one or more heat dissipating zones.

The integrated device 404 further includes a layer 410 disposed (formed) between and in heat transfer relationship with the first active layer 406 and the second active layer 408. The layer 410 includes or is configured to define at least one thermal electric cooling device. As such, the layer 410 is also referred to as a cooling layer 410. The cooling layer 410 is configured to reject heat from one or more respective zones of the first and second active layers 406 and 408 during normal operations.

The integrated device 404 defines an electronic component—in particular, an integrated circuit—having one or more active devices such as diodes, transistors, data storage elements, etc. The integrated device 404 further includes built-in cooling (heat rejection) by way of the TECD(s) of the cooling layer 410. The cooling layer 410 is understood to be designed in accordance with a determination of the heat dissipating characteristics of the active layers 406 and 408, respectively.

The apparatus 400 also includes an integrated device 412. The integrated device 412 includes a first active layer 414 and a second active layer 416. Each of the active layers 414 and 416 is configured to define one or more electronic devices or circuit elements such as diodes, transistors, etc., in accordance with the normal operation and purpose of that particular active layer. Each of the active layers 414 and 416 is also a heat dissipating entity defined by one or more respective heat dissipating zones.

The integrated device 412 also includes a first cooling layer 418 and a second cooling layer 420. Each of the cooling layers 418 and 420 are respectively defined by one or more thermal electric cooling elements. The first cooling layer 418 is disposed between the active layers 414 and 416 and is in heat transfer relationship therewith. The first cooling layer 418 is configured to reject heat from one or more zones of the active layers 414 and 416, respectively.

In turn, the second cooling layer 420 is disposed (formed) over and in heat transfer relationship with a portion of the second active layer 416. The second cooling layer 420 is configured to reject heat from one or more zones of the second active layer 416.

The integrated devices 404 and 412 include respective, built-in cooling resources by virtue of the cooling layers 410, 418 and 420. The integrated devices 404 and 412 further include various electronic devices and elements so as to define respective integrated circuits or portions thereof.

The present teachings thus contemplate an unlimited number of integrated electronic entities defining logic circuits, analog circuits, microprocessors or microcontrollers, data storage arrays, etc., having on-board solid-state heat rejection resources. Such heat rejection resources, in the form of thermal electric cooling devices (layers), are designed and formed in accordance with a mapping (i.e., predetermination) of the heat dissipating zones and rates of the respective active layers. Precision, zone-oriented cooling is provided, thus avoiding other cooling options associated with excessive material scale and wasted energy consumption.

Fifth Illustrative Apparatus

Figure 5:
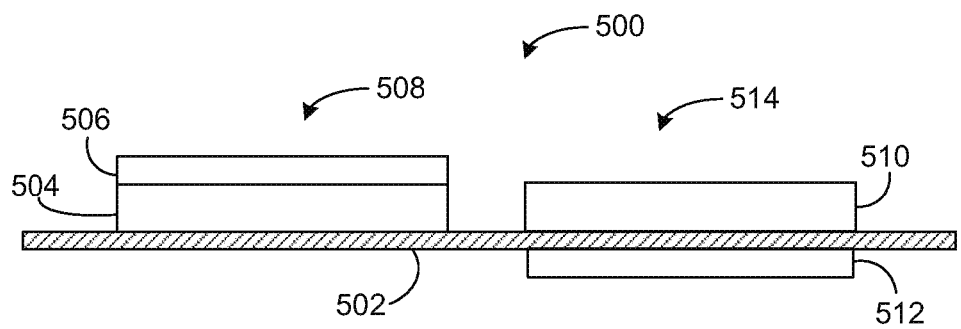
FIG. 5 is an elevation block diagram depicting an apparatus according to another embodiment.

Reference is now made to FIG. 5, which depicts an elevation view of an apparatus 500. The apparatus 500 is illustrative and non-limiting with respect to the present teachings. Other apparatuses, devices or systems can be configured and/or operated in accordance with the present teachings.

The apparatus 500 includes a circuit board (or substrate) 502. The circuit board 502 includes an electronic device 504. The electronic device 504 can be defined by any electronic or electrical heat dissipating entity such as a microprocessor, microcontroller, power transistor, diode, memory array, thyristor device, relay, hybrid integrated circuit, etc. Other electronic devices can also be used. The electronic device 504 is discrete in form and distinct from other entities and resources of the apparatus 500. However, the electronic device 504 can be electrically coupled with other devices and resources of the apparatus 500.

The apparatus 500 also includes a discrete thermal electric cooling device 506. The TECD 506 is disposed over and in heat transfer (thermal) relationship with the electronic device 504 and is configured to reject heat from one or more zones thereof. The TECD 506 can be mounted or bonded to the heat dissipating entity 504 using thermally conductive paste, mounting hardware, etc. The electronic device 504 and the TECD 506 define a device pairing or association 508. In another embodiment (not shown); one or more electronic devices (e.g.,. 504) have two or more respective TECDs (e.g., 506) in heat transfer relationship therewith. Thus, heat dissipating devices and TECDs need not be associated in one-to-one correspondence.

The apparatus 500 also includes an electronic device (i.e., heat dissipating entity) 510. The electronic device 510 can be defined by any electronic or electrical heat dissipating entity such as a microprocessor, microcontroller, power transistor, integrated circuit, etc. Other electronic devices can also be used. The electronic device 510 is discrete in form and distinct from other entities and resources of the apparatus 500. The electronic device 510 can, of course, be electrically coupled with other devices and resources of the apparatus 500.

The apparatus 500 also includes a discrete thermal electric cooling device 512. The TECD 512 is disposed beneath and in heat transfer relationship with the electronic device 510. Thus, the TECD 512 is supported by the circuit board 502 and in thermally conductive proximity to the electronic device 510. The thermal electric cooling device 512 is configured to reject heat from one or more zones of the electronic device 510 or other heat dissipating devices on the substrate 502. The TECD 512 can be mounted or bonded to the heat dissipating entity 510 using thermally conductive paste, mounting hardware, etc. The electronic device 510 and the TECD 512 define a device pairing or association 514.

The present teachings contemplate an unlimited number of apparatuses defining or including discrete logic circuits, analog or digital devices, microprocessors or microcontrollers, data storage arrays, etc. Select of these electronic, heat dissipating entities are associated with one or more discrete thermal electric cooling devices. The TECDs are disposed in accordance with a mapping of the heat dissipating zones of the respective electronic devices.

First Illustrative Method

Figure 6:
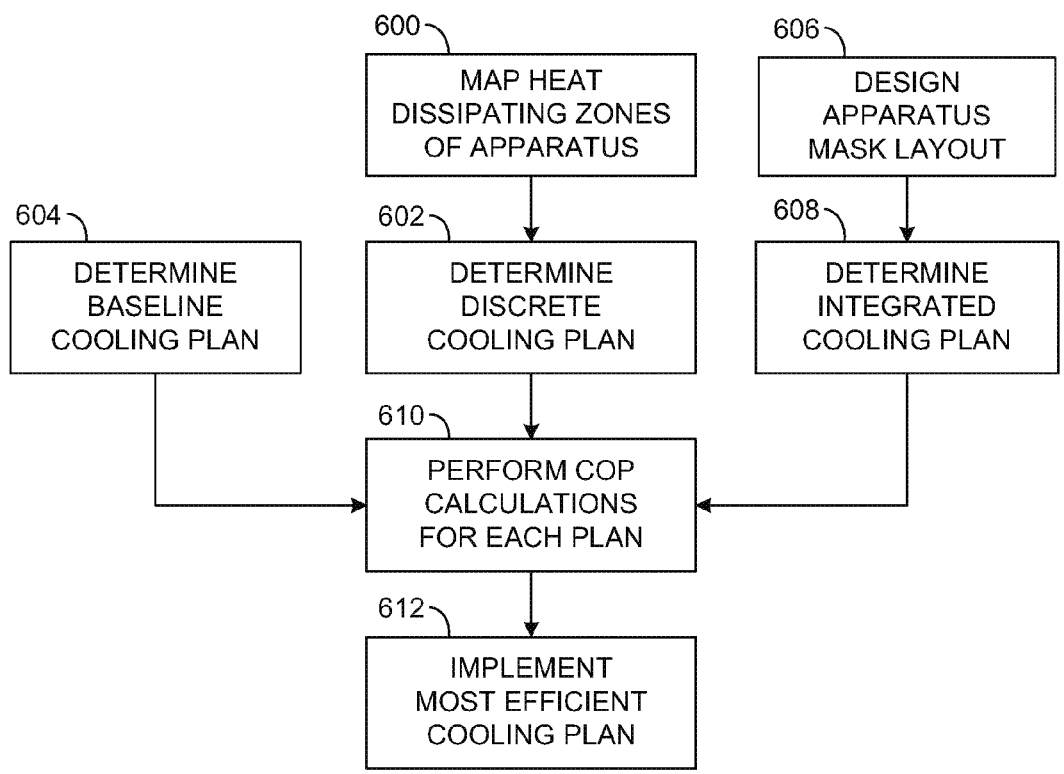
FIG. 6 is a flow diagram depicting a method according to one embodiment.

Attention is directed to FIG. 6, which depicts a flow diagram of a method according to one embodiment of the present teachings. The method of FIG. 6 includes particular operations and order of execution. However, other methods including other operations, omitting one or more of the depicted operations, and/or proceeding in other orders of execution can also be used according to the present teachings. Thus, the method of FIG. 6 is illustrative and non-limiting in nature. Reference is also made to FIGS. 3-5 in the interest of understanding the method of FIG. 6.

At 600, the heat dissipating zones of an apparatus are mapped. For purposes of non-limiting illustration, it is assumed that an apparatus of defined constituency and arrangement is provided. Such an apparatus can be, for non-limiting example, a circuit board of a computer. The particular heat dissipating entities (e.g., electronic components, integrated circuits, etc.) are then analyzed to determine the respective heat dissipating zones and rates thereof. This analysis and determination is referred to as mapping.

At 602, a discrete cooling plan is determined. For purposes of the ongoing illustration, it is assumed that one or more discrete, thermal electric cooling devices are selected according to the mapping at step 600 above. Each of the TECDs is planned for placement in heat transfer relationship with one or more heat dissipating zones of the apparatus. In some embodiments—but not necessarily all—one or more heat dissipating entities identified during the mapping at step 600 above are not selected for association with any thermal electric cooling device. This determination is made according to a minimum heat dissipation threshold, resource allocation limit, etc.

At 604, a baseline cooling plan is determined. For purpose of the ongoing illustration, a cooling plan that is optionally—but not necessarily—dependent (i.e., requiring or involving) upon one or more thermal electric cooling devices or entities is determined. For non-limiting example, such a baseline cooling plan can be based on one or more fan units, a circulated fluid coolant, one or more mechanical heat exchangers, etc. The baseline cooling plan can be based upon prior experience with or design related to the apparatus under consideration or the mapping performed at step 600, etc.

At 606, an apparatus mask layout is designed. For purposes of the ongoing illustration, it is assumed that the mask layouts pertaining to active integrated device formation are being designed. As such, the step 606 is performed in those embodiments that are yet to be constructed and additional design features—namely, integrated cooling—can be incorporated. Integrated devices 404 and 412 are non-limiting examples consistent with step 606. This is in contrast to embodiments of pre-existing construction in which additional cooling features must be incorporated by way of discrete devices. Device pairings 508 and 514 are non-limiting examples of the latter scenario.

At 608, an integrated cooling plan is determined. For purposes of non-limiting example, it is assumed that one or more cooling layers (e.g., 418) are determined and incorporated into the mask layout design from 606 above. Such a cooling layer plan is directed to providing integrated heat rejection within selected heat dissipating entities. Such a selection process is made according to a mapping of the zones of the apparatus or device under consideration at 606 above.

At 610, a coefficient of performance (COP) is calculated for each of the cooling plans. For purpose of non-limiting illustration, cooling plans determined at 602, 604 or 608 are respectively treated for COP calculation. In one illustrative scenario, a device cooling plan has been determined for a pre-existing apparatus at both 602 and 604 above, and steps 606 and 608 have been omitted. In another illustrative scenario, an apparatus is in design phase and three different cooling plans have been determined at 602, 604 and 608, respectively. Such COP calculations are typically—but not necessarily—performed by way of a computer running appropriate software code.

At 612, a cooling plan is implemented in accordance with efficiency or other design criteria or constraints. For purposes of the ongoing example, it is determined that a discrete-device cooling plan from 602 above is the most efficient in accordance with the COP calculations, is consistent with any other applicable criteria, and is selected for implementation. Such an implementation can result, for non-limiting example, in an embodiment analogous to apparatus 300.

The foregoing method is illustrative of any number of methods contemplated by the present teachings. In general, and without limitation, an apparatus is under evaluation with respect to its heat rejection needs. Such an apparatus can be an existing entity or may be in the design and planning phases, or some combination of both existence and planning. The apparatus includes (or will include) one or more heat dissipating entities in the form of electronic components, electrical devices, microprocessors, integrated circuits, mechanical subsystems, etc. Each heat dissipating entity is further defined by one or more respective heat dissipating zones.

The heat dissipating zones of the apparatus are then identified and mapped to determine their respective locations and heat dissipation rates during normal or peak operations, etc. The mapping and, optionally, prior or other information, are then used to determine two or more cooling plans. At least one of these cooling plans involves the use of thermal electric cooling devices (or layers). Each of the thermal electric cooling devices is planned for association with one or more zones of the heat dissipating entities of the apparatus.

The coefficients of performance are then calculated and compared for each of the cooling plans. The most efficient cooling plan is selected and implemented according to the comparison. The resulting apparatus will then have cooling resources that are optimized with respect to material implementation and energy needs. In many embodiments, one or more of the heat dissipating entities identified in the mapping are not associated with any thermal electric cooling device, in accordance with a minimum heat dissipation threshold or other criteria.

Second Illustrative Method

Figure 7:
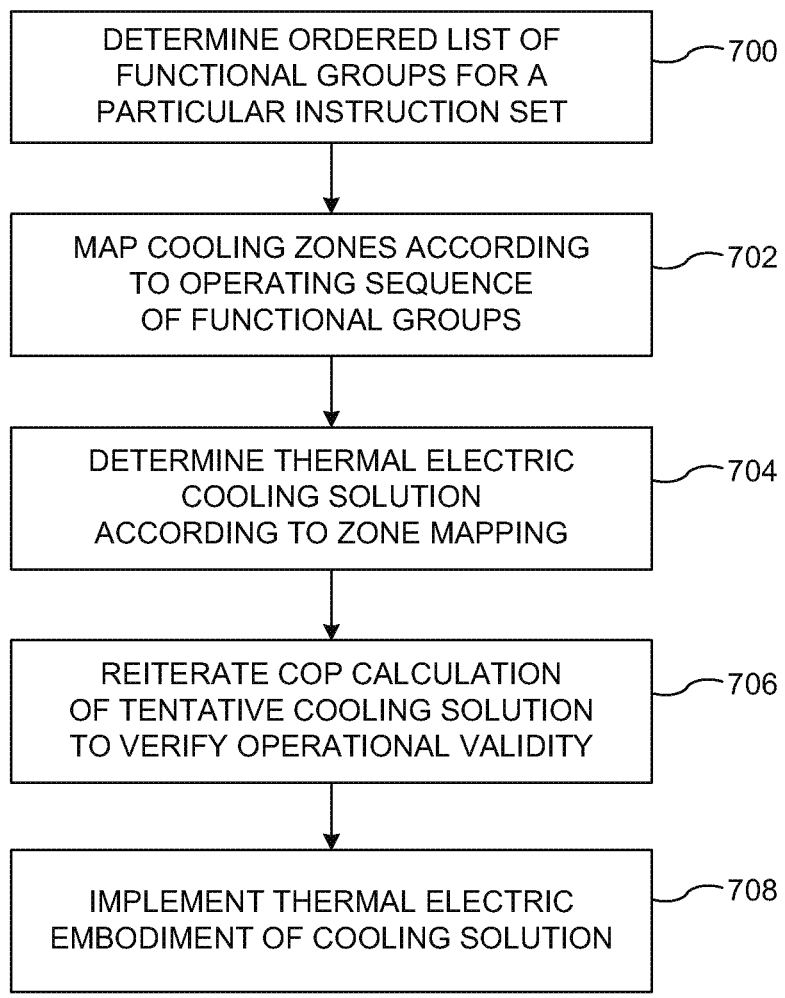
FIG. 7 is a flow diagram depicting a method according to another embodiment.

Attention is directed to FIG. 7, which depicts a flow diagram of a method according to one embodiment of the present teachings. The method of FIG. 7 includes particular operations and order of execution. However, other methods including other operations, omitting one or more of the depicted operations, and/or proceeding in other orders of execution can also be used according to the present teachings. Thus, the method of FIG. 7 is illustrative and non-limiting in nature.

At 700, an ordered list of functional groups is determined for an instruction set or predetermined sequence of operations. For purposes of non-limiting illustration, it is assumed that a microprocessor of an apparatus is defined by numerous internal resources. For further purposes of this present example, it is assumed that the electronic device 504 is such a microprocessor. Non-limiting examples of internal resources include cache data storage, arithmetic logic units, input/output circuitry, etc. Other resources can also be present. These resources, individually or in cooperative associations, are also referred to as functional groups that dissipate heat during normal operation of the microprocessor 504. A particular instruction set, or program code, is analyzed to determine the intensity and sequence of operation of these functional groups during execution of the program code.

At 702, the cooling zones are mapped according to the operating sequence determined at 700 above. For purposes of the present example, it is assumed that zones of the microprocessor 504 that require cooling (heat rejection) are identified and mapped according to their respective heat dissipation rates and operating sequences.

At 704, a thermal electric cooling solution is determined according to the zone mapping performed at 702 above. This cooling solution will include a number of TECDs and their respective capacities and placements with respect to the zones of the microprocessor 504. The cooling solution can also include specification of an operating sequence or relative capacities for each TECD. For purposes of the present example, it is assumed that a single TECD 506 is selected for cooling the electronic device 504.

At 706, the coefficient-of-performance (COP) of the cooling plan is performed (or repeated) to verify operational validity. The COP is analyzed to determine if the cooling plan from 704 above is more efficient than other cooling options. Such other cooling options can include the use of fans, circulated fluid coolants, etc. For purposes of the present example, it is assumed that the TECD cooling solution is valid and most efficient compared to other options.

At 708, the thermal electric cooling solution is implemented. The cooling plan determined at 704, and verified at 706, above, is put into effect. Thus, a thermal electric cooling device 506 is mounted and operated in heat transfer relationship with the microprocessor (electronic device) 504.

In general, and without limitation, the present teachings contemplate various planning and analysis methods in which one or more cooling solutions are devised and compared for respective performance efficiencies. The most relatively efficient cooling plan is then implemented. The mapping and analysis steps, can be performed in an iterative manner with respect to individual heat dissipating entities or zones of an apparatus, performed at a circuit board-wide level, etc. Numerous of the cooling solutions contemplated by the present teachings include the selection and placement (or integration) of thermal electric cooling devices with respect to heat dissipating zones to be served.

In general, the foregoing description is intended to be illustrative and not restrictive. Many embodiments and applications other than the examples provided would be apparent to those of ordinary skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

What is claimed is:

1. A method performed at least in part using a computer, the method comprising:
    mapping one or more heat dissipating entities of an apparatus;
    determining a first cooling plan in accordance with the mapping, the first cooling plan dependant upon one or more thermal electric cooling devices;
    determining a second cooling plan different than the first cooling plan;
    calculating a first coefficient-of-performance (COP) for the first cooling plan and a second COP for the second cooling plan; and
    implementing either the first cooling plan or the second cooling plan in accordance with a comparison of the first COP with the second COP.

2. The method according to claim 1, the apparatus including one or more electronic circuit boards.

3. The method according to claim 1, the mapping including identifying one or more heat dissipating zones of an integrated circuit of the apparatus.

4. The method according to claim 3, the integrated circuit being defined by a microprocessor or a microcontroller.

5. The method according to claim 1, the mapping performed such that each of the heat dissipating entities is defined by one or more heat dissipating zones.

6. The method according to claim 1, the first cooling plan including at least an operating sequence or respective capacities for the one or more thermal electric cooling devices.

7. The method according to claim 1, the implementing including formation of one or more thermal electric cooling devices integral to one of the heat dissipating entities of the apparatus.

8. The method according to claim 1, the implementing including disposition of one or more discrete thermal electric cooling devices in heat transfer relationship with one or more of the heat dissipating entities of the apparatus.

9. The method according to claim 1, the implementing including disposition of a plurality of thermal electric cooling devices in heat transfer relationship with respective ones of the heat dissipating entities of the apparatus.

10. The method according to claim 9, the implementing further including selecting at least one of the heat dissipating entities subject to the mapping to be unrelated to any thermal electric cooling device.

11. An apparatus, comprising:
    a plurality of heat dissipating entities, each of the heat dissipating entities respectively defined by one or more heat dissipating zones; and
    a plurality of thermal electric cooling devices disposed in heat transfer relationship with respective ones of the heat dissipating entities, each of the thermal electric cooling devices corresponding to one or more of the heat dissipating zones, at least one of the heat dissipating entities of the apparatus not in a heat transfer relationship to any of the thermal electric cooling devices.

12. The apparatus according to claim 11, the heat dissipating entities being defined by respective electronic devices.

13. The apparatus according to claim 11, at least two of the thermal electric cooling devices having respectively different heat transfer capacities.

14. The apparatus according to claim 11, at least one of the thermal electric cooling devices being discrete and distinct with respect to the related heat dissipating entity.

15. The apparatus according to claim 11, at least one of the thermal electric cooling devices being integral to the related heat dissipating entity.

* * * * *